US006891653B2

(12) United States Patent
Liu et al.

(10) Patent No.: US 6,891,653 B2
(45) Date of Patent: May 10, 2005

(54) METHOD AND APPARATUS FOR STEERING AN OPTICAL BEAM IN A SEMICONDUCTOR SUBSTRATE

(75) Inventors: Ansheng Liu, Cupertino, CA (US); Mario J. Paniccia, Santa Clara, CA (US); Michael T. Morse, San Jose, CA (US); Dmitri E. Nikonov, Santa Clara, CA (US); Yi Ding, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 10/177,872

(22) Filed: Jun. 19, 2002

(65) Prior Publication Data

US 2002/0173058 A1 Nov. 21, 2002

Related U.S. Application Data

(62) Division of application No. 09/811,171, filed on Mar. 16, 2001, now Pat. No. 6,690,036.

(51) Int. Cl.$^7$ .............................................. G02F 1/025
(52) U.S. Cl. ..................................... 359/279; 359/320
(58) Field of Search ................................ 359/279, 320; 385/8, 10, 14

(56) References Cited

U.S. PATENT DOCUMENTS

| | | |
|---|---|---|
| 5,661,825 A | 8/1997 | Van Dam et al. |
| 5,838,844 A | 11/1998 | Van Dam et al. |
| 5,933,554 A | 8/1999 | Leuthold et al. |
| 2002/0051601 A1 | 5/2002 | Hung |
| 2002/0089711 A1 | 7/2002 | Conzone et al. |
| 2002/0191886 A1 | 12/2002 | Castoidi et al. |
| 2003/0002767 A1 | 1/2003 | Hanneman, Jr. |
| 2003/0053731 A1 | 3/2003 | Bhowmik |

OTHER PUBLICATIONS

Kareenahalli, S., "Experimental Confirmation of Phase Relationships of Multimode Interference Splitters Using a Shearing–Type Near–Field Sagnac Interferometer," IEEE Photonics Technology Letters, vol. 9, No. 7, pp. 937–939, Jul. 1997.

Rasmussen, T., "Design and Performance Evaluation of 1–by–64 Multimode Interference Power Splitter for Optical Communications," Journal of Lightwave Technology, vol. 13, No. 10, pp. 2069–2074, Oct. 1995.

Bachmann, M., "General self–imaging properties in N×N multimode interference couplers including phase relations," Applied Optics, vol. 33, No. 18, pp. 3905–3911, Jun. 20, 1994.

Smit, M.K., "PHASAR–Based WDM–Devices: Principles, Design and Applications," IEEE Journal of Selected Topics in a Quantum Electronics, vol. 2, No. 2, pp. 236–250, Jun. 1996.

Soldano, L.B., "Optical Multi–Mode Interference Devices Based on Self–Imaging: Principles and Applications," Journal of Lightwave Technology, vol. 13, No. 4, pp. 615–627, Apr. 1995.

Rajarajan, M., "Accurate Analysis of MMI Devices with Two–Dimensional Confinement," Journal of Lightwave Technology, vol. 14, No. 9, Sep. 1996.

Lorenzo, R.M., "Improved self–imaging characteristics in 1×N multimode couplers," IEEE Proc.–Optoelectron., vol. 145, No. 1, Feb. 1998.

*Primary Examiner*—George Fourson
(74) *Attorney, Agent, or Firm*—Blakely, Sokoloff, Taylor & Zafman LLP

(57) ABSTRACT

An optical steering method and apparatus. In one aspect of the present invention, the disclosed apparatus includes a multi-mode interference (MMI) device disposed in a semiconductor substrate. The MMI device includes an input and a plurality of outputs. Each one of the plurality of outputs of the MMI device is optically coupled to the input of the MMI device. A phase array is disposed in the semiconductor substrate. The phase array includes a plurality of inputs and a plurality of outputs. The plurality of inputs of the phase array optically are coupled to the plurality of outputs of the phase array. The phase array is coupled to control relative phase differences between optical beams output by each one of the plurality of outputs of the phase array.

6 Claims, 4 Drawing Sheets

METHOD AND APPARATUS FOR STEERING AN OPTICAL BEAM IN A SEMICONDUCTOR SUBSTRATE

This is a Divisional of U.S. application Ser. No. 09/811,171, filed Mar. 16, 2001, now U.S. Pat. No. 6,690,036 now pending.

BACKGROUND OF THE INVENTION

1. Field of the Invention

The present invention relates generally to the switching signals and, more specifically, the present invention relates to switching or steering optical signals.

2. Background Information

The need for fast and efficient optical switches is increasing as Internet data traffic growth rate is overtaking voice traffic pushing the need for optical communications. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent, material that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Methods and apparatuses for steering an optical beam in a semiconductor substrate are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical steering device is provided in a fully integrated solution on a single integrated circuit chip. One embodiment of the presently described optical steering includes a multi mode interference (MMI) device in a semiconductor substrate that splits an optical beam into a plurality of optical beams. The plurality of optical beams are directed into a phase array in the semiconductor substrate. In one embodiment, the phase array controls the relative phase differences between the plurality of optical beams such that an interference intensity pattern is utilized to direct the optical beam to a desired optical output. Embodiments of the disclosed optical steering device can be used in a variety of high bandwidth applications including multi-processor, telecommunications, networking or the like.

Figure 1:
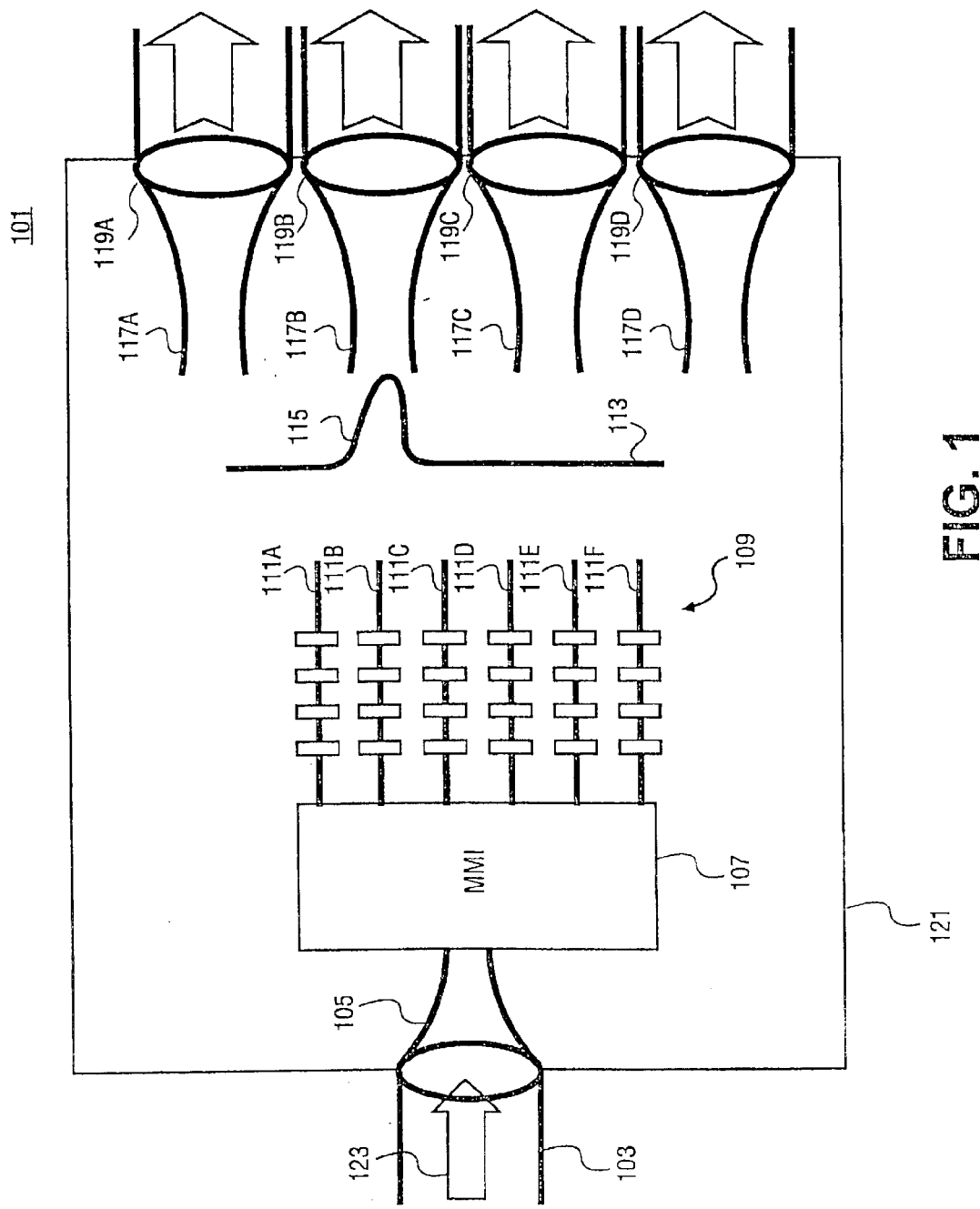
FIG. 1 is a block diagram illustrating one embodiment of an optical steering device in accordance with the teachings of the present invention.

To illustrate, FIG. 1 is a block diagram showing one embodiment of an optical steering device 101 in accordance with the teachings of the present invention. As shown in the depicted embodiment, an MMI device 107 is disposed in a semiconductor substrate 121. In one embodiment, semiconductor substrate 121 includes silicon, a III-V semiconductor or another suitable type of material. A waveguide 105 is disposed in the semiconductor substrate 121 to optically couple an input optical fiber 103 to an input of the MMI device 107. In one embodiment, waveguide 105 is a tapered waveguide in semiconductor substrate 121 having a tapered end optically coupled to MMI device 107. In one embodiment, waveguide 105 is a rib waveguide in a silicon semiconductor substrate 121. Input optical fiber 103 is a single mode optical fiber and is optically coupled to the non-tapered end of waveguide 105. In one embodiment, waveguide 105 is both laterally and vertically tapered so that efficient fiber to silicon chip coupling in waveguide 105 is realized.

In one embodiment, an optical beam 123 propagates through input optical fiber 103 and into an input of MMI device 107 through waveguide 105. In one embodiment, optical beam 123 is infrared or near infrared light. For example, in one embodiment, optical beam 123 has a wavelength of 1.3 µm or 1.55 µm. As will discussed in greater detail below, MMI device 107 splits optical beam 123 into a plurality of optical beams, each of which is output from one of a plurality of outputs of MMI device 107. In one embodiment, a phase array 109 disposed in semiconductor substrate 121 is optically coupled to the plurality of outputs of MMI device. As shown in the depicted embodiment, phase array 109 includes a plurality of phase control elements 111A, 111B, 111C, 111D, 111E and 111F. In one embodiment, each of the phase control elements 111A, 111B, 111C, 111D, 111E and 111F include a waveguide, such as for example a rib waveguide, in semiconductor substrate 121 having a stack of trench capacitors. In one embodiment, each of the split optical beams 123 propagating out of MMI device 107 propagate through the waveguides and stacks of trench capacitors.

In one embodiment, the relative phase differences between the split optical beams 123 propagating from phase array 109 are controlled by phase array 109 so that a resulting interference intensity pattern 113 is controlled. As illustrated in FIG. 1, interference intensity pattern 113 is controlled such that a maxima 115 of interference intensity pattern 113 in the far-field region is selectively directed to one of a plurality of outputs 117A, 117B, 117C or 117D. Thus, the interference pattern 113 can be controlled in response to phase array 109 such that maxima 115 is directed or steered selectively to output 117A, 117B, 117C or 117D. In one embodiment, the plurality of outputs 117A, 117B, 117C or 117D include waveguides positioned in semiconductor substrate 121 across from phase array 109. Output optical fibers 119A, 119B, 119C and 119D are optically coupled to outputs 117A, 117B, 117C and 117D, respectively, in one embodiment through which optical beam 123 may propagate after exiting optical steering device 101. Accordingly, input optical fiber 103 is selectively optically coupled to one of output optical fibers 119A, 119B, 119C and 119D through MMI device 107 and phase array 109 in accordance with the teachings of the present invention.

It is noted that optical steering device has been illustrated above for explanation purposes with an MMI device 107 having 6 outputs, a phase array 109 having 6 phase control elements 111A, 111B, 111C, 111D, 111E and 111F and 4 optical outputs 117A, 117B, 117C and 117D of optical steering device 101. It is appreciated that other numbers of outputs for MMI device 107, other numbers of phase control elements for phase array 109 and other numbers of outputs for optical steering device 101 may be employed in accordance with the teachings of the present invention.

Figure 2:
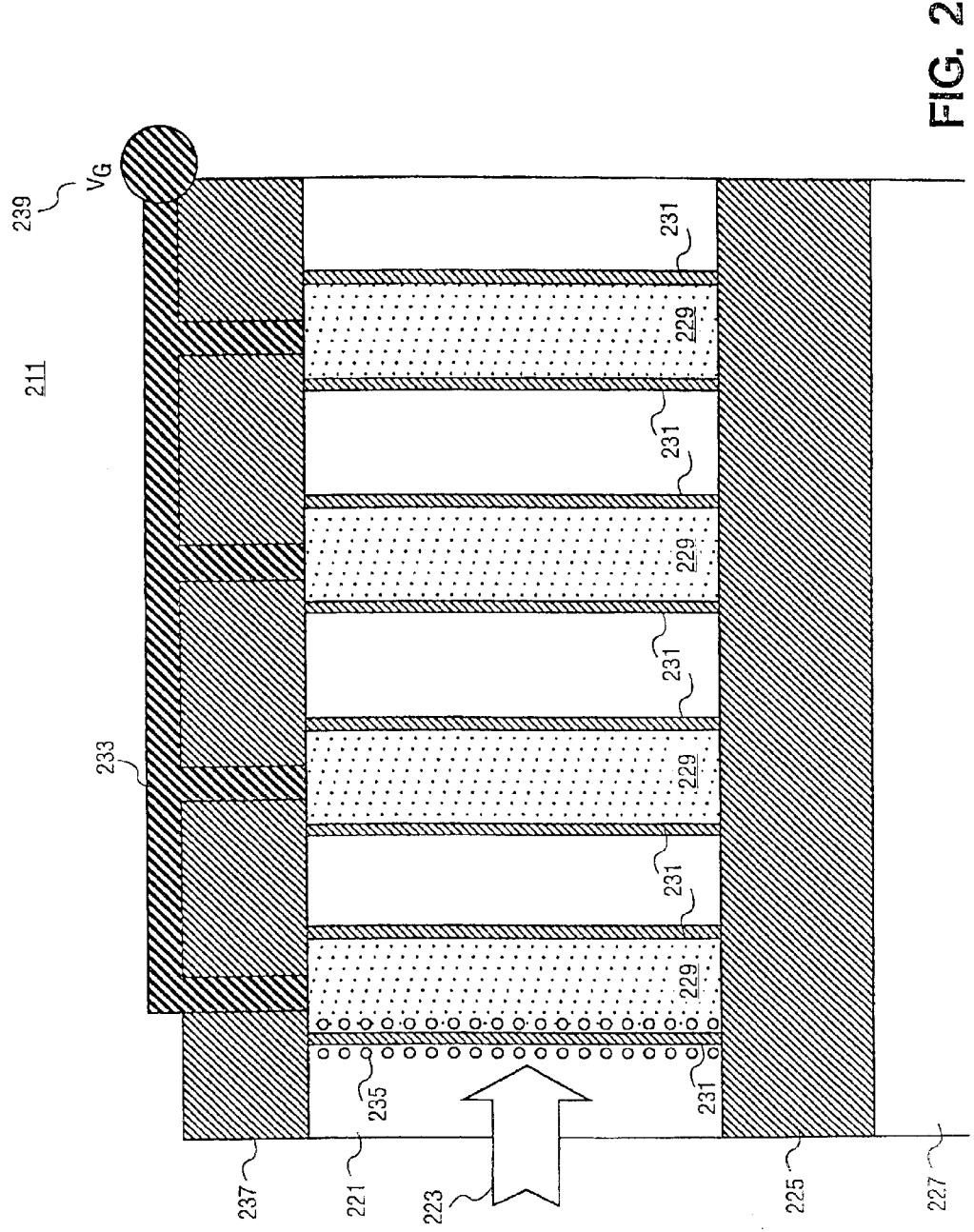
FIG. 2 is a cross-section view illustration of one embodiment of a waveguide of one of the phase control elements of a phase array in accordance with the teachings of the present invention.

FIG. 2 is a cross-section view illustration of one embodiment of a waveguide of one of the phase control elements 211 of a phase array in accordance with the teachings of the present invention. In one embodiment, phase control element 211 is one of a plurality of trenched silicon rib waveguides in semiconductor substrate 211. In one embodiment, a plurality of trench capacitors are formed with polysilicon regions 229 disposed in semiconductor substrate 221. In one embodiment, insulating regions 231 are disposed between polysilicon regions 229 and semiconductor substrate to form trench capacitors.

In one embodiment, the wafer on which phase control element is disposed is a silicon-on-insulator (SOI) wafer. Accordingly, a buried insulating layer 225 is disposed between semiconductor substrate 221 and semiconductor substrate 227 of the SOI wafer. In addition, semiconductor substrate 221 is disposed between buried insulating layer 225 and insulating layer 237. In one embodiment, insulating layer 237 is an interlayer dielectric layer of the wafer on which phase control element 221 is disposed.

In one embodiment, an optical waveguide, such as for example a rib waveguide, is disposed in semiconductor substrate 221 between insulating layers 237 and 225. As such, optical beam 223 is illustrated in FIG. 2 propagating from left to right. In one embodiment, optical beam 223 includes infrared or near infrared light. As mentioned, in one embodiment, semiconductor substrate 211 includes silicon. As known to those skilled in the art, silicon is partially transparent to infrared or near infrared light. For instance, in one embodiment in which phase control element 211 is utilized in telecommunications, optical beam 223 has an infrared wavelength of approximately 1.55 or 1.3 micrometers. In one embodiment, insulating layers 225 and 237 include an oxide material and optical beam 223 is therefore confined to remain within the waveguide between insulating layers 225 and 237 as a result of total internal reflection since oxide has a smaller index of refraction than silicon or polysilicon.

As shown in the embodiment of FIG. 2, polysilicon regions 229 are coupled to receive a control signal $V_G$ 239 through conductors 233 routed through insulating layer 237. In the depicted embodiment, the trench capacitors formed by polysilicon regions 229 in semiconductor substrate 221 are biased in response the control signal $V_G$ 239 such that the concentration of free charge carriers in charged regions 235 is modulated. For instance, in one embodiment, when $V_G$ is varied, injected free electrons and holes included in charge regions 235 accumulate at the interfaces between the polysilicon regions 229 and insulating regions 231 and at the interfaces between semiconductor substrate 221 and insulating regions 231. Accordingly, as optical beam 223 propagates through the waveguide between insulating layers 225 and 237, optical beam 223 propagates through the modulated charged regions 235.

In one embodiment, the phase of optical beam 223 that passes through the charged regions 235 is modulated in response to the control signal $V_G$ 239. In one embodiment, the phase of optical beam 223 passing through free charge carriers in charged regions 235 is modulated due to the plasma optical effect. The plasma optical effect arises due to an interaction between the optical electric field vector and free charge carriers that may be present along the propagation path of the optical beam 223. The electric field of the optical beam 223 induces a change in the velocity of the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. The amount of phase shift φ is given by $$\phi = (2\pi/\lambda)\Delta nL \quad \text{(Equation 1)}$$

with the optical wavelength in vacuum λ and the interaction length L. In the case of the plasma optical effect in silicon, the refractive index change Δn due to the electron (ΔN$_e$) and hole (ΔN$_h$) concentration change is given by:

$$\Delta n = -\frac{e^2\lambda^2}{8\pi^2 c^2 \varepsilon_0 n_0}\left(\frac{\Delta N_e}{m_e^*} + \frac{\Delta N_h}{m_h^*}\right) \quad \text{(Equation 2)}$$

where n$_o$ is the nominal index of refraction for silicon, e is the electronic charge, c is the speed of light, ε$_0$ is the permittivity of free space, m$_e^*$ and m$_h^*$ are the electron and hole effective masses, respectively.

It is noted that four trench capacitors have been illustrated in FIG. 2 for explanation purposes with polysilicon regions 229 disposed in semiconductor substrate 221. It is appreciated that in other embodiments, there may be a greater or fewer number of trench capacitors in accordance with the teachings of the present invention with the number of trench capacitors chosen to achieve the required phase shift. In particular, the interaction length L discussed in connection with Equation 1 above may be varied by increasing or decreasing the total number of trench capacitors of phase control element 211.

Figure 3:
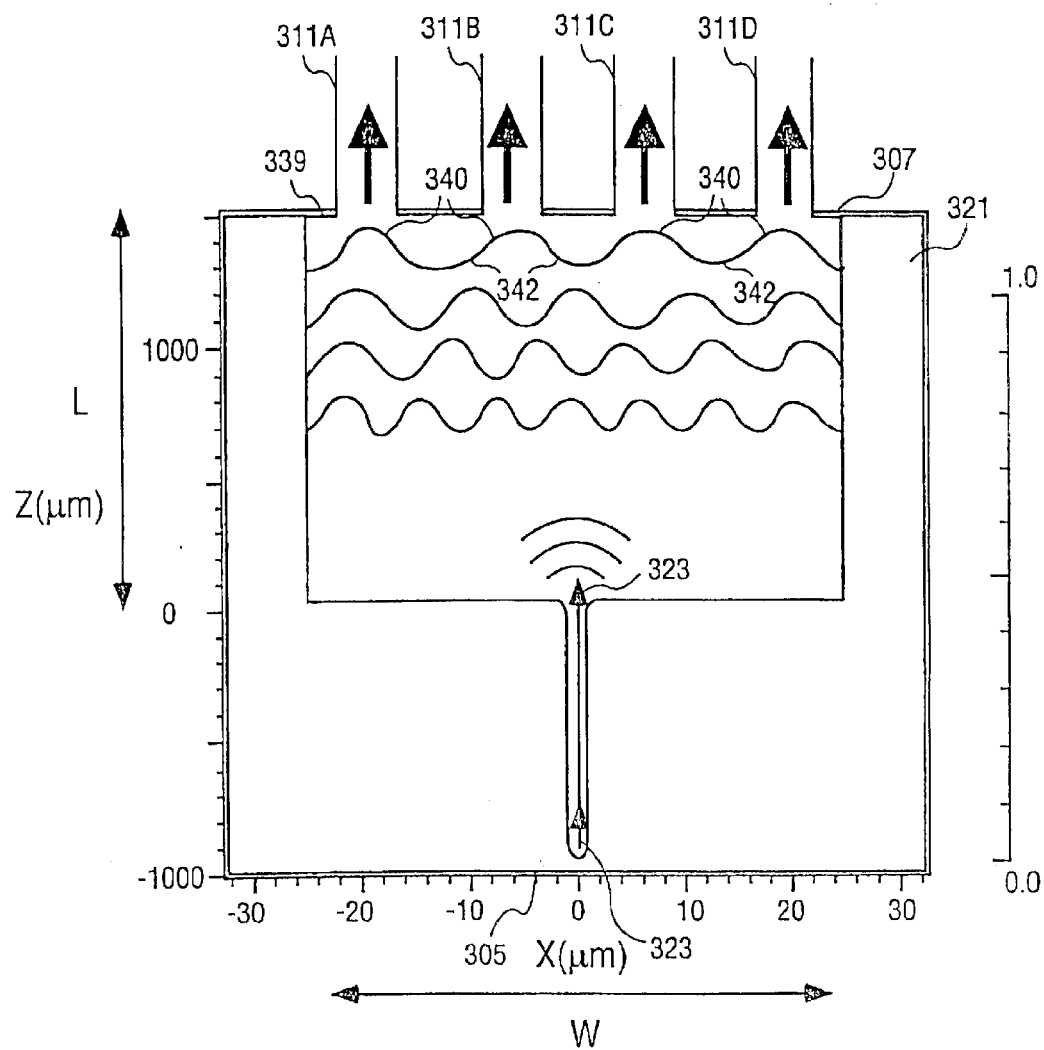
FIG. 3 is an illustration of one embodiment of a multi mode interference (MMI) device employed in an optical steering device in accordance with the teachings of the present invention.

FIG. 3 is an illustration of one embodiment of a multi mode interference (MMI) device 307 employed in an optical steering device in accordance with the teachings of the present invention. As shown, MMI device 307 includes a waveguide 339 disposed in a semiconductor substrate. In one embodiment, optical beam 323 is directed into waveguide 339 through waveguide 305. In one embodiment, waveguide 305 is a tapered waveguide. In one embodiment, optical beam 323 is confined to remain within waveguide 339 until exiting with cladding 321. As shown, the cladding 321 of waveguide 339 in one embodiment has a length L and a width W and is designed to support a large number of modes in waveguide 339. In one embodiment, there are a plurality of M outputs from waveguide 339 shown as waveguides 311A, 311B, 311C and 311D. Accordingly, in the illustrated embodiment, M=4. It is appreciated that in other embodiments, M may be equal to numbers greater or less than 4 in accordance with the teachings of the present invention.

As illustrated in FIG. 3, optical beam 323 propagates from entry location 341 from waveguide 305 into waveguide 339 and is eventually deflected from the cladding enclosing waveguide 339. The deflected wavefronts of optical beam 323 interfere with each other within waveguide 339 of MMI device 307 such maximas 340 and minimas 342 are created as shown. In one embodiment, L and W are designed such that there is a maxima located at each output location corresponding to the plurality of outputs. Thus, in one embodiment, there is a maxima 340 at the entry location for each of the plurality of M waveguides 311A, 311B, 311C and 311D. In one embodiment, split optical beams 323 output from all M outputs of MMI device 307 have substantially equal amplitude. Accordingly, the optical power of split optical beams 323 in waveguides 311A, 311B, 311C and 311D are substantially equal.

Figure 4:
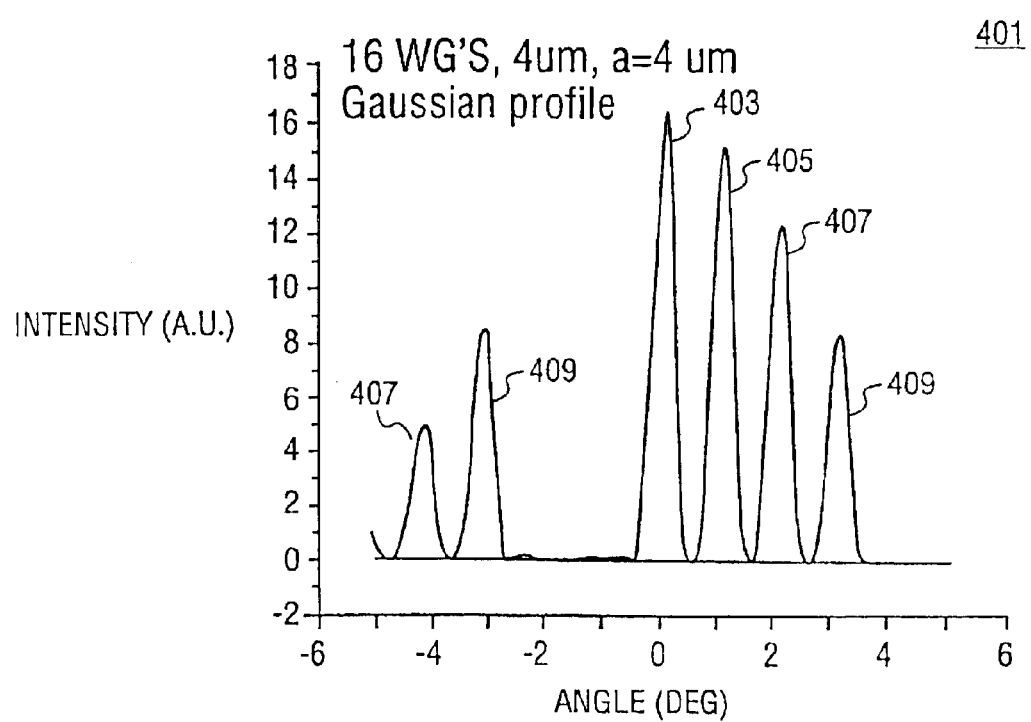
FIG. 4 is diagram illustrating one embodiment of a far-field intensity pattern using a plurality of waveguides in accordance with the teachings of the present invention.

FIG. 4 is diagram illustrating one embodiment of a far-field intensity pattern 401 using a plurality of waveguides in accordance with the teachings of the present invention. As mentioned, by controlling the relative phase differences between the plurality of optical beams output from the MMI device, the far-field interference intensity pattern is controlled to direct an optical beam to a desired optical output in accordance with the teachings of the present invention. As shown in FIG. 4, the angular depen dence of far-field intensity pattern 401 of for example 16 waveguides similar to waveguides 111A, 111B, etc. of phase array 109 of FIG. 1 is illustrated. In the example shown, the waveguide width is approximately 4 μm and the waveguide to waveguide separation is approximately 4 μm.

In the illustrated embodiment, peak 403 represents no phase shift. Peak 405 represents π/3 phase shift. Peaks 407 represent 2π/3 phase shift. Peaks 409 represent π phase shift. As illustrated in FIG. 4, where there is no phase shift, the main peak appears at an angle of zero in one embodiment. As the phase shift is increased, the main peak is controlled to move to large angles. Accordingly by varying the voltages, such as for example V$_G$ 239 in FIG. 2, applied to the polysilicon regions 229, optical beam 123 can be selectively optically coupled to one of the plurality of outputs 117A, 117B, 117C or 117D in FIG. 1 and realize optical beam steering in accordance with the teachings of the present invention.

Throughout this specification, it is noted that the phase array 109 and phase control elements of the optical switches of FIGS. 1–2 have been illustrated using trench capacitors for discussion purposes. Trench capacitors in accordance with the teachings of the present invention produce an index of refraction change in the semiconductor substrate layers in which the trench capacitors are disposed. As discussed, the changes in index of refraction produce phase shifts of optical beams. In some embodiments, the effects of the phase shifts of the optical beams produce optical beam steering such that optical beams may be selectively directed to optical output ports in accordance with the teachings of the present invention. It is appreciated that in other embodiments, other types of phase arrays and/or phase control elements may be employed in accordance with the teachings of the present invention. Other known types of phase control elements that may be employed include for example thermal heaters, current injectors, P-N junctions, or the like.

As is known, thermal heating of the semiconductor substrate layer in the optical beam can be employed to change the index of refraction to phase shift an optical beam. In one embodiment of the present invention, known thermal heating is accomplished in phase control element by depositing thermal heaters on the surface of a semiconductor substrate layer in the form of polysilicon resistors or implanting diffusion based resistors and passing current through these resistors. In another embodiment, known current injectors are employed in phase control element for current injection to inject charge carriers into the phase shift region of in the semiconductor substrate layer. In yet another embodiment, current injection is accomplished by a phase control element by using known forward biased diodes or P-N junctions disposed in the semiconductor substrate layer. In still another embodiment, known reverse biased P-N junctions are employed by a phase control element, which when biased cause a depletion region to be formed in the semiconductor substrate layer. The formed depletion region causes an index change by sweeping out charge carriers in the depletion region of the semiconductor substrate layer.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method, comprising:
splitting an optical beam into a plurality of optical beams with a multi-mode interference (MMI) device disposed in a semiconductor substrate;
directing the plurality of optical beams from a plurality of outputs of the MMI device into a plurality of inputs of a phase array disposed in the semiconductor substrate, the phase array having the plurality of inputs optically coupled to the plurality of outputs of the MMI device and the phase array having a plurality of outputs; and
selectively illuminating one of a plurality of optical outputs with the phase array by controlling relative phase differences between a plurality of optical beams output from the plurality of outputs of the phase array.

2. The method of claim 1 wherein selectively illuminating one of the plurality of optical outputs with the phase array by controlling the relative phase differences between the plurality of optical beams output from the plurality of outputs of the phase array includes controlling an interference intensity pattern resulting from the plurality of outputs of the phase array.

3. The method of claim 2 wherein controlling the relative phase difference between the plurality of optical beams output from the plurality of outputs of the phase array includes modulating a plurality of charged regions in the phase array to control the interference intensity pattern.

4. The method of claim 2 wherein controlling the relative phase difference between the plurality of optical beams output from the plurality of outputs of the phase array includes modulating an index of refraction of the phase array to control the interference intensity pattern.

5. The method of claim 1 wherein directing the plurality of optical beams from the plurality of outputs of the MMI device into the plurality of inputs of a phase array includes directing the plurality of optical beams through a plurality of waveguides disposed in the phase array.

6. The method of claim 1 further comprising directing an optical beam into the MMI device through a tapered waveguide.

* * * * *